United States Patent
Wu

(10) Patent No.: US 9,104,940 B2
(45) Date of Patent: Aug. 11, 2015

(54) LINE SEGMENTATION METHOD APPLICABLE TO DOCUMENT IMAGES CONTAINING HANDWRITING AND PRINTED TEXT CHARACTERS OR SKEWED TEXT LINES

(71) Applicant: KONICA MINOLTA LABORATORY U.S.A., INC., San Mateo, CA (US)

(72) Inventor: Chaohong Wu, Mountain View, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 154 days.

(21) Appl. No.: 14/015,048

(22) Filed: Aug. 30, 2013

(65) Prior Publication Data

US 2015/0063699 A1      Mar. 5, 2015

(51) Int. Cl.
*G06K 9/34*       (2006.01)

(52) U.S. Cl.
CPC ..................... *G06K 9/344* (2013.01)

(58) Field of Classification Search
CPC .... G06K 9/344; G06K 9/4671; G06K 9/4638
See application file for complete search history.

(56) References Cited

U.S. PATENT DOCUMENTS

| | | | | |
|---|---|---|---|---|
| 5,513,304 | A * | 4/1996 | Spitz et al. | 715/268 |
| 6,674,900 | B1 * | 1/2004 | Ma et al. | 382/176 |
| 8,009,928 | B1 * | 8/2011 | Manmatha et al. | 382/283 |
| 8,606,011 | B1 * | 12/2013 | Ivanchenko et al. | 382/176 |
| 8,774,461 | B2 * | 7/2014 | Vaidya | 382/103 |
| 2003/0147548 | A1 * | 8/2003 | Ruhl et al. | 382/100 |
| 2009/0080783 | A1 * | 3/2009 | Hirohata | 382/218 |
| 2009/0324100 | A1 * | 12/2009 | Kletter et al. | 382/217 |

OTHER PUBLICATIONS

Arthur et al., "k-means++: The Advantage of Careful Seeding", 18th annual ACM-SIAM symposium on Discrete algorithms, 2007.
"Clustering", Opencv documentation, http://docs.opencv.org/modules/core/doc/clustering.html, 3 pages, printed from internet on Aug. 7, 2014.
Louloudis et al., "Text line detection in handwriting documents", Pattern Recognition 41, 2008, pp. 3758-3772.
Louloudis et al., "Text line and word segmentation of handwritten documents", Pattern Recognition 42, 2009, pp. 3169-3183.

\* cited by examiner

*Primary Examiner* — Jingge Wu
(74) *Attorney, Agent, or Firm* — Chen Yoshimura LLP

(57) ABSTRACT

A text line segmentation method for a document image containing printed text and handwriting, or document image containing skewed lines or printed text. Connected component (CC) are obtained for the document, and their bounding boxes and centroids are calculated. The CCs are categorized into three categories based on bounding box sizes: small objects, regular text objects, and large objects involving handwriting. The centroids of regular text objects are used in a cluster analysis to find the vertical centers of the N text lines. Then, each CC is classified into one of the N lines based on the vertical distance between its centroid and the vertical centers of text lines, and copied into to a corresponding object board. Extra spaces are removed from the object boards to obtain the line segments. The large object involving handwriting will be classified into one of the lines but absent from other lines.

12 Claims, 3 Drawing Sheets

Fig. 2(a)

TH     OAN AGREEMENT AND PROMISSORY NOTE, is made this         day of

Fig. 2(b)

Fig. 2(c)

th       e of       na (hereinafter known as "BORROWER") and JOHN SMITH, LLC, an LLC

Fig. 2(d)

org     zed under the laws of the State of Alaska (hereinafter known as "LENDER").

Fig. 2(e)

BORROWER and LENDER shall collectively be known herein as "the Parties". In determining

Fig. 2(f)

Photoshop's Lab mode covers all the color belonging to the RGB mode and CMYK mode. The RGB mode is the most suitable color mode for computer screen.,whereas the CMYK mode is appropriate

Fig. 3(a)

Photoshop's Lab mode covers all the color belonging to the RGB mode and CMYK mode.

Fig. 3(b)

The RGB mode is the most suitable color mode for computer screen.,whereas the CMYK

Fig. 3(c)

mode is appropriate

Fig. 3(d)

LINE SEGMENTATION METHOD APPLICABLE TO DOCUMENT IMAGES CONTAINING HANDWRITING AND PRINTED TEXT CHARACTERS OR SKEWED TEXT LINES

BACKGROUND OF THE INVENTION

1. Field of the Invention

This invention relates to processing of document images, and in particular, it relates to a method for processing document images containing both printed lines of text and handwriting, or containing skewed text lines, to generate text line segments.

2. Description of Related Art

In digital processing of document images, i.e., digital images that represent documents, document segmentation techniques are often used to segment text in the document into paragraphs, lines, words, and characters, etc. When a document contains both printer text and handwriting, the handwriting sometimes intersects or overlaps printed characters. Often, handwritten characters are larger than printed characters and occupy white spaces between printed text lines. As a result, X-Y cut projection method, which is frequently used to segment document images into text lines, often does not give satisfactory result in separating text lines. Also, when the text has significant skew and the line spacing is relatively small, the start/end of one line may be at the same vertical position as the end/start of an adjacent line, causing difficulties in a projection method.

SUMMARY

The present invention is directed to a method of text line segmentation that substantially obviates one or more of the problems due to limitations and disadvantages of the related art.

An object of the present invention is to provide a method of segmenting document image that contain printed text and handwriting of various sizes into lines of printed text that do not contain the handwriting.

Another object of the present invention is to provide a method of segmenting document images where the text lines have relatively narrow line spacing and contain significant skew.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for segmenting a binary document image containing multiple printed lines of text to obtain segmented lines of printed text, which includes: (a) performing a connected component analysis on the document image to generate a plurality of connected components; (b) computing a bounding box and centroid for each of the plurality of connected components; (c) based on heights of the bounding boxes of the connected components, categorizing the plurality of connected components into three categories including small objects, regular text objects, and large objects; (d) performing cluster analysis on vertical positions of the centroids of the connected components in the category of regular text objects, using a number (N) of text lines in the document image as a number of cluster centers for the cluster analysis, to calculate N cluster centers which represent central vertical positions of the N text lines; (e) classifying each connected component obtained in step (a) as belonging to a text line based on vertical distances between the centroid of the connected component and the central vertical positions of the text lines calculated in step (d), and copying the connected component into one of N object boards designated for that text line, wherein each object board is a template having a size identical to a size of the document image, each object board being designated for one of the N lines of text of the document image; and (f) removing extra spaces in each of the N object boards to obtain N text line segments.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIG. 2(a)-2(f) illustrate an example of a document image containing handwriting and the result of text line segmentation using the method of FIG. 1.

FIG. 3(a)-3(d) illustrate an example of document image containing skewed text lines and the result of text line segmentation using the method of FIG. 1.

DETAILED DESCRIPTION OF PREFERRED EMBODIMENTS

Embodiments of the present invention provides a method that can be used for segmenting a document image which contains both lines of printed text and handwriting that intersect printed text characters to obtain text lines that do not contain handwriting. The method can also be used for segmenting text with narrow line spacing and significant skew. The method uses connected component analysis and cluster analysis (e.g. the K-means++ algorithm) to separate text lines which are difficult to separate using X-Y cut profile projection method. Furthermore, this method can separate text lines that do not produce clear white spaces in a horizontal projection profile due to skew or other distortion or noises.

Figure 1:
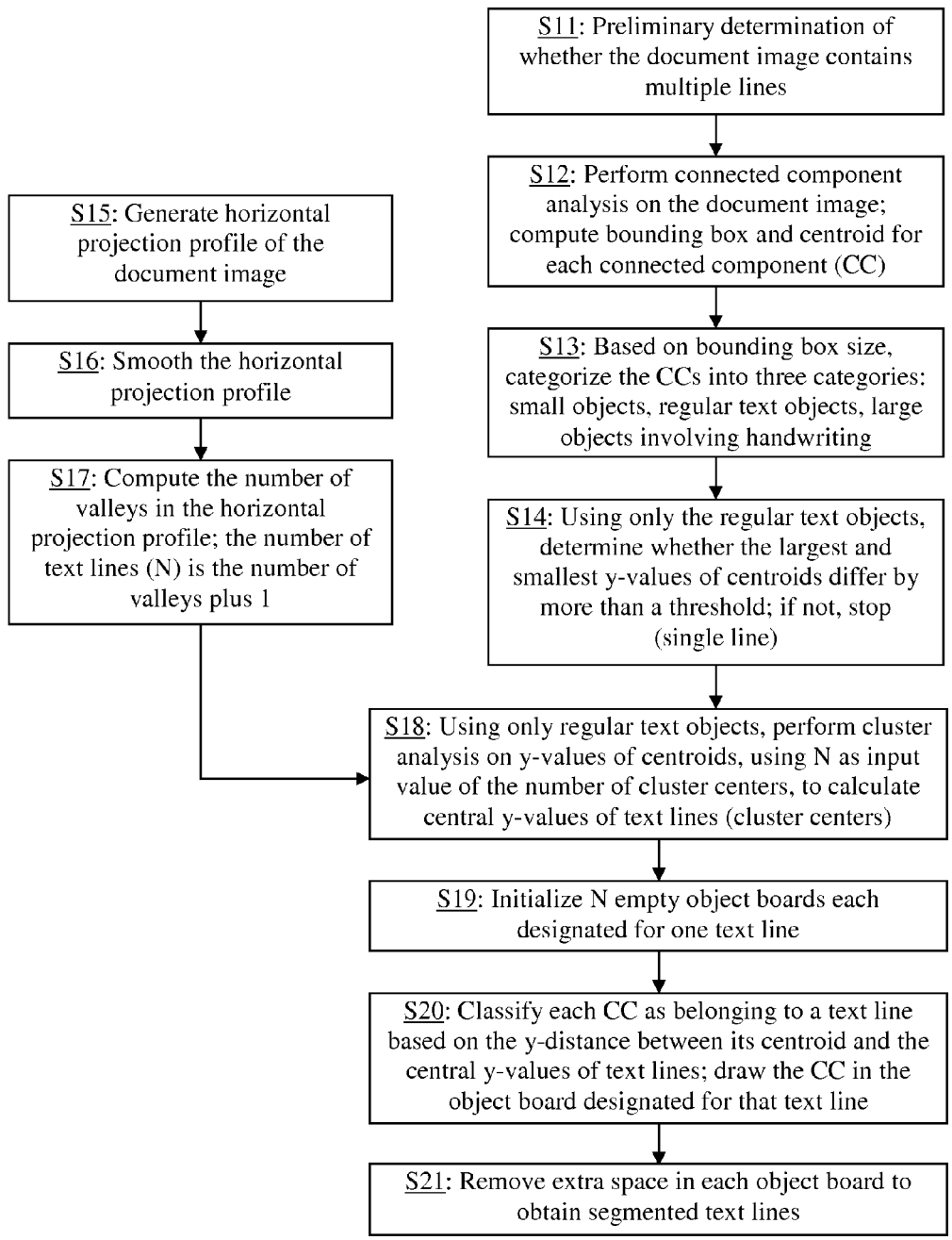
FIG. 1 schematically illustrates a method of segmenting a document image including printed text and handwriting to obtain lines of printed text according to an embodiment of the present invention.

FIG. 1 schematically illustrates a text line segmentation method according to an embodiment of the present invention. Prior to applying the steps of FIG. 1, the document image may undergo certain pre-processing steps, many of which are generally known in the art. The process of FIG. 1 can be applied to a document image corresponding to a whole page of document, or a section of a page, such as a block, a paragraph of text, multiple consecutive text lines, etc. The document image is a binary image having black and white pixel values.

First, a preliminary determination may be carried out to determine whether the document image has multiple lines (step S11). A document image that has only one line does not need to go through line segmentation. As an example, an X-Y cut recursive projection may be performed first on the document image, and the heights of projected text lines may be used to decide whether a projected text line needs to be processed further. For example, when the projected text line is more than 1.5 times of the average height of single text lines, it is regarded as a possible multiple-line text line, and the following steps of the line segmentation method will be applied to it.

A connected component analysis is first applied to the document image to identify each connected component (CCs) (step S12). A connected component is a group of non-white pixels that are connected with each other. A bounding box and a centroid are computed for each CC are calculated (step S12). Based on the heights of the bounding boxes, all CCs are classified into three categories (step S13): small objects, such as dots of character "i" and "j", small punctuation marks or parts thereof, noises, etc.; regular text objects, including printed text characters or the main parts thereof for characters that have two parts such as "i" and "j"; and large objects, involving handwriting and printed characters (if any) that are connected thereto. Such large objects may be referred to as hybrid symbols for convenience. The classification step S13 may be done by specifying two threshold values for bounding box sizes. In one example, objects with bounding box shorter than 0.5 times the average symbol size (height) of the document image are classified as small objects, and those with bounding box shorter than 3 times the average symbol size are classified as large objects. Other threshold values may be used. The average symbol size (height) of the document image may be calculated from the bounding box heights of all CCs obtained in step S12.

Then, a step S14 is performed to verify that the document image indeed contains more than one line of text. To do this, the y-coordinate values of the centroids of all regular text objects (small and large objects are excluded) are examined; if the difference between the largest and smallest of such y-values is greater than a threshold (e.g., the average symbol size), then the document image is determined to contain multiple text lines, and the line segmentation process can continue. Otherwise, the document image is determined to contain only one line and the segmentation process stops. The reason for using only regular text objects is that for one text line, the centroids off regular text objects should be close to each other in the y direction, while the centroids for large and small objects may deviate in the y direction significantly.

Prior to continuing to the next step (S18), a process is performed to calculate the number of text lines in the document image (steps S15 to S17). First, a horizontal projection profile of the document image is generated (step S15). Any suitable method may be used to generate the horizontal projection profile, such as summation of pixel values for each row horizontally. The value of the horizontal projection profile is the number of non-white pixels at each pixel location along the y-coordinate (vertical direction). For a typical document image, the horizontal projection profile has distinctive peak regions and valley regions, where each peak corresponds to a line of text and each valley corresponds to a white space between two lines of text. Typically, the profile is near zero in the valleys, but if handwriting is present between lines, the profile will have small non-zero values in the valleys. The horizontal projection profile may be smoothed, for example, by using sliding window average (step S16, optional).

Then, the number of valleys in the horizontal projection profile is computed (step S17). This may be done as follows: If $P(i-D)-P(i)>T$, and $P(i+D)-P(i)>T$, then i is in a valley region. Here, P(i) denotes the horizontal projection profile, i denotes the y-coordinate value (the vertical position), D is a step size, which may be approximately the average symbol size, and T is a threshold value referred to as the valley depth. For example, a valley depth of 80 pixels may be used. The number of text lines (N) is defined as the number of valleys plus one.

Note that the above criteria for determining valleys presume that the valley widths are no larger than the average symbol size (step D). For documents with large line spacing, larger than the average symbol size, line segmentation is much less challenging and other methods may be successfully used to segment the lines. The line segmentation method described in this disclosure is suitable for segmenting text lines that are separate by narrow line spacing, when other line segmentation methods often fail.

Steps S15 to S17 are preferably performed after step S14 to avoid waste of effort in case the process is stopped after step S14.

Then, a cluster analysis is applied to the y-coordinate values of all CCs for regular text objects, excluding CCs for small objects and CCs for large objects (step S18). The number of lines (N) computed in step S17 is inputted into the clustering algorithm as the number of cluster centers. The output of the clustering analysis is the cluster centers for the clusters. Here, because only regular text objects are used in the cluster analysis, each cluster center will represent the central y-coordinate value of a line of text.

Cluster analysis (also called clustering) is a technique used in statistical data analysis (data mining), machine learning, and other fields. The main goal of cluster analysis is to classify a set of data objects into groups, where objects within a group are more similar to each other than to objects in other groups by some defined measure. Various clustering algorithms are known which can classify data objects into multiple (more than two) clusters, including k-means and Gaussian Mixture Modeling. In a preferred embodiment of the present invention, a k-means++ algorithm (k-means algorithm with k-means++ initialization) is used for the cluster analysis in step S18. K-means++ is described in David Arthur and Sergei Vassilvitskii, "k-means++: The Advantage of Careful Seeding", 18th annual ACM-SIAM symposium on Discrete algorithms (2007). One particular implementation of this embodiment uses the OpenCV implementation of k-means++, namely, in the OpenCV function "kmeans", the parameter "flags" is set to KMEANS_PP_CENTERS. The OpenCV function kmeans is available as a part of the OpenCV (Open Source Computer Vision Library) library and its documentation may be found at: http://docs.opencv.org/modules/core/doc/clustering.html or other available sources. The number of text lines (N) computed in step S17 is inputted into the k-means++ algorithm as the number of cluster centers. The k-means algorithm outputs a classification (a cluster index) for each sample point in the input data set, as well as the means (the cluster center) for each cluster and a variance.

To segment the text lines, N (the number of text lines) empty object boards are initialized, each designated for one text line (step S19). Each object board has the same size as the input document image and functions as a template. Once the cluster centers (central y-coordinate values of the text lines)

are calculated in step S18, all CCs, including the CCs for regular text objects as well as small objects and large objects, are classified according to the vertical (y) distance between their centroids and the central y-coordinate values of the text lines, and copied into the object board designated for the corresponding text line (step S20). In other words, for each CC, the central y-coordinate value that is the closest to the centroid of the CC in the y direction is found, and the CC is classified as belonging to that text line, and copied into the corresponding object board. As a result, only CCs in the same text line will be copied into the same object board.

For large objects that involve handwriting and any printed text characters connected thereto (hybrid symbols), the object will typically be taller than a printed text character, and it will be classified into one of the several lines that its size occupies (see FIG. 2(c)).

After all CCs are processed, extra white space in each object board is removed, leaving only the rectangular-shapes part that bounds the text line (step S21). This may be done by performing an X-Y cut projection for each object board. As a result, each object board produces one segmented line of text.

FIGS. 2(a)-2(f) illustrate an example of a document image and the resulting text line segments. FIG. 2(a) shows the document image before text line segmentation. As can be seen, this document image includes five lines of text with handwriting spilling into multiple lines of text. FIGS. 2(b)-2(f) show the five text line segments after line segmentation, corresponding to the first to fifth lines in that order. It can be seen that the handwriting is connected with many printed characters, forming a hybrid symbol. This hybrid symbol object has a centroid that is the closest in the y direction to the center of the second line of printed text, and is classified accordingly and copied into the second object board shown in FIG. 2(c) (the extra space has been removed). It can also be seen from FIGS. 2(b), 2(d) and 2(e) that printed characters that are connected to the handwriting are missing from the respective line segments (e.g., the part "IS L" in the first line, etc.). This is because these characters do not form individual connected components.

Alternatively (not shown in FIG. 2), the hybrid symbol object can be removed from the line it belongs to, i.e., not copied into the corresponding object board, and treated separately in further processing steps. As a result, the line segment to which the hybrid symbol object belongs will now have a height similar to other line segments, while a gap will be introduced at the location of the handwriting.

It should be noted that the above-described text line segmentation method is not intended to separate handwriting from printed characters that it intersects. As can be seen from FIG. 2(c), the printed characters that intersect the handwriting remain connected to the handwriting. Rather, the method is intended to separate lines of printed text from hybrid symbols, so that each hybrid symbol will become a part of one segmented line, with the other segmented lines containing only printed text characters, even though some of the printed characters may be missing from the lines due to being connected with the handwriting.

The above described text line segmentation method may be used to segment lines of text having significant distortion including skew or have high noise levels, such as a document image produced by scanning a printed document. If such a document image does not contain handwriting of large sizes, the category of large objects in the categorization step S13 will be empty. In the example shown in FIG. 3(a), the image having three single spaced text lines with some skew cannot be satisfactorily segmented by X-Y cut profile projection, because there exist significant skew distortion of text lines which makes boundaries between peaks (text) and valleys (space) in the projection profile difficult to detect. Such a document image can be successfully segmented into text lines using the method described above (see FIGS. 3(b)-3(d)). This is because the projection profile is only used to detect the number of valleys, not the boundaries between the text and space between lines. The cluster analysis is reliable so long as the vertical offset between characters as the two ends of the line is less than approximately a half of the distance between adjacent lines. This corresponds to about 1.7 to 1.8 degrees of skew for a typical single-spaced document. If skew is too severe in the document image, de-skewing processing can be applied first. Current de-skewing methods can correct skew in scanned document images to below 1.0 degree.

The examples of text used in this disclosure contain horizontal lines. The method can be easily modified to process text that contain vertical lines of text, by switching the x and y coordinates.

Figure 4:
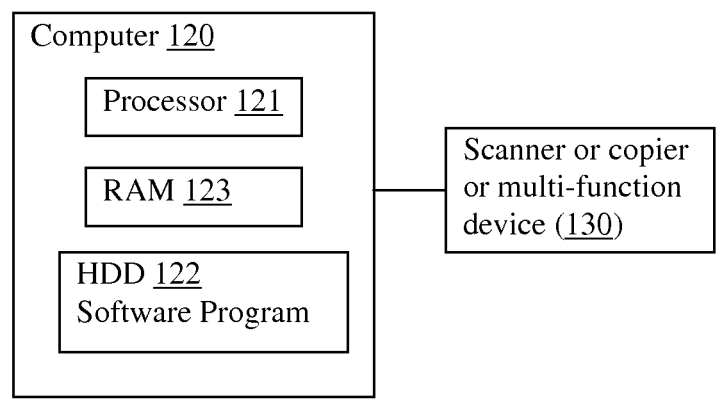
FIG. 4 schematically illustrates a data processing apparatus in which embodiments of the present invention may be implemented.

The text line segmentation methods described here can be implemented in a data processing apparatus such as a computer 120 shown in FIG. 4. The computer 120 includes a processor 121, a storage device (e.g. hard disk drive) 122, and an internal memory (e.g. RAM) 123. The storage device 122 stores software programs, which are read out to the RAM 123 and executed by the processor 121 to carry out the methods described here. The computer 120 may be connected to a scanner, copier or multi-function device 130 which has a scanning section that can be used to scan a printed document to be processed by the computer 120. Alternatively, the processor 121, storage device 122 and RAM 123 may be located within the scanner/copier/multi-function device 130, in which case the scanner/copier/multi-function device can directly output processed document such as OCR'ed text. The term data processing apparatus may refer to either the computer 120 or the scanner/copier/multi-function device 130.

It will be apparent to those skilled in the art that various modification and variations can be made in the text line segmentation method and related apparatus of the present invention without departing from the spirit or scope of the invention. Thus, it is intended that the present invention cover modifications and variations that come within the scope of the appended claims and their equivalents.

What is claimed is:

1. A method for segmenting a binary document image containing multiple printed lines of text to obtain segmented lines of printed text, comprising:
   (a) performing a connected component analysis on the document image to generate a plurality of connected components;
   (b) computing a bounding box and centroid for each of the plurality of connected components;
   (c) based on heights of the bounding boxes of the connected components, categorizing the plurality of connected components into three categories including small objects, regular text objects, and large objects;
   (d) performing cluster analysis on vertical positions of the centroids of the connected components in the category of regular text objects, using a number (N) of text lines in the document image as a number of cluster centers for the cluster analysis, to calculate N cluster centers which represent central vertical positions of the N text lines;
   (e) classifying each connected component obtained in step (a) as belonging to a text line based on vertical distances between the centroid of the connected component and the central vertical positions of the text lines calculated in step (d), and copying the connected component into one of N object boards designated for that text line, wherein each object board is a template having a size identical to a size of the document image, each object board being designated for one of the N lines of text of the document image; and (f) removing extra spaces in each of the N object boards to obtain N text line segments.

2. The method of claim 1, further comprising, before step (d), obtaining the number N of text lines in the document image, including:
- (g1) calculating a horizontal projection profile of the document image;
- (g2) detecting a number of valleys in the horizontal projection profile; and
- (g3) calculating the number N of text lines in the document image as the number of valleys plus one.

3. The method of claim 2, further comprising, after step (g1) and before step (g2), smoothing the horizontal projection profile using sliding window average.

4. The method of claim 1, further comprising, after step (c) and before step (d):
- determining whether a difference between the largest and smallest vertical positions of the centroids of the connected components in the category of regular text objects exceeds a threshold value.

5. The method of claim 1, wherein step (c) includes comparing the bounding box height of each connected component to two threshold values.

6. The method of claim 1, wherein step (d) employs a k-means++ algorithm.

7. A computer program product comprising a computer usable non-transitory medium having a computer readable program code embedded therein for controlling a data processing apparatus, the computer readable program code configured to cause the data processing apparatus to execute a process for segmenting a binary document image containing multiple printed lines of text to obtain segmented lines of printed text, comprising:
- (a) performing a connected component analysis on the document image to generate a plurality of connected components;
- (b) computing a bounding box and centroid for each of the plurality of connected components;
- (c) based on heights of the bounding boxes of the connected components, categorizing the plurality of connected components into three categories including small objects, regular text objects, and large objects;
- (d) performing cluster analysis on vertical positions of the centroids of the connected components in the category of regular text objects, using a number (N) of text lines in the document image as a number of cluster centers for the cluster analysis, to calculate N cluster centers which represent central vertical positions of the N text lines;
- (e) classifying each connected component obtained in step (a) as belonging to a text line based on vertical distances between the centroid of the connected component and the central vertical positions of the text lines calculated in step (d), and copying the connected component into one of N object boards designated for that text line, wherein each object board is a template having a size identical to a size of the document image, each object board being designated for one of the N lines of text of the document image; and
- (f) removing extra spaces in each of the N object boards to obtain N text line segments.

8. The computer program product of claim 7, wherein the process further comprises, before step (d), obtaining the number N of text lines in the document image, including:
- (g1) calculating a horizontal projection profile of the document image;
- (g2) detecting a number of valleys in the horizontal projection profile; and
- (g3) calculating the number N of text lines in the document image as the number of valleys plus one.

9. The computer program product of claim 8, wherein the process further comprises, after step (g1) and before step (g2), smoothing the horizontal projection profile using sliding window average.

10. The computer program product of claim 7, wherein the process further comprises, after step (c) and before step (d):
- determining whether a difference between the largest and smallest vertical positions of the centroids of the connected components in the category of regular text objects exceeds a threshold value.

11. The computer program product of claim 7, wherein step (c) includes comparing the bounding box height of each connected component to two threshold values.

12. The computer program product of claim 7, wherein step (d) employs a k-means++ algorithm.

\* \* \* \* \*